United States Patent
Woo et al.

(10) Patent No.: US 11,975,761 B2
(45) Date of Patent: May 7, 2024

(54) CHASSIS PLATFORM MODULE FOR ELECTRIC VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 17/462,717

(22) Filed: Aug. 31, 2021

(65) Prior Publication Data
US 2022/0063725 A1 Mar. 3, 2022

(30) Foreign Application Priority Data

Sep. 1, 2020 (KR) ........................ 10-2020-0110896

(51) Int. Cl.
| | | |
|---|---|---|
| B62D 21/07 | (2006.01) | |
| B62D 27/02 | (2006.01) | |
| B60K 1/04 | (2019.01) | |
| B62D 21/03 | (2006.01) | |
| B62D 27/06 | (2006.01) | |

(52) U.S. Cl.
CPC ........... *B62D 21/07* (2013.01); *B62D 27/023* (2013.01); *B60K 1/04* (2013.01); *B60K 2001/0438* (2013.01); *B62D 21/03* (2013.01); *B62D 27/065* (2013.01)

(58) Field of Classification Search
CPC ...... B62D 21/07; B62D 21/12; B62D 27/023; B60K 2001/0438
See application file for complete search history.

(56) References Cited

U.S. PATENT DOCUMENTS

| | | | | |
|---|---|---|---|---|
| 9,567,013 | B2 * | 2/2017 | Ehrlich | ................. F16B 17/004 |
| 10,131,381 | B2 * | 11/2018 | Ashraf | ................. B62D 63/025 |
| 10,300,948 | B2 * | 5/2019 | Ashraf | ................... B62D 21/07 |

(Continued)

FOREIGN PATENT DOCUMENTS

| | | | | |
|---|---|---|---|---|
| DE | 102017124636 A1 * | 6/2018 | ............. B62D 21/02 |
| EP | 2 508 412 A1 | 10/2012 | |

(Continued)

OTHER PUBLICATIONS

Extended European Search Report issued in corresponding European Patent Application No. 21194032.5 dated Jan. 25, 2022.

*Primary Examiner* — Jason S Morrow
(74) *Attorney, Agent, or Firm* — Morgan, Lewis & Bockius LLP (57) ABSTRACT

A chassis platform module for an electric vehicle may include: a frame part having a battery module coupled thereto, and including a plurality of members assembled to each other; a first support part extending from one side of the frame part in a longitudinal direction thereof, having a front wheel chassis module mounted thereon, and including a connection member assembled to the frame part; a second support part extending from another side of the frame part in the longitudinal direction thereof, and having a rear wheel chassis module mounted thereon; and a connector part including a plurality of connector members assembled between the plurality of members of the frame part or assembled to the frame part and the first support part so as to connect the plurality of members to the connection member.

8 Claims, 11 Drawing Sheets

(56) References Cited

U.S. PATENT DOCUMENTS

| | | | | |
|---|---|---|---|---|
| 10,392,052 B2* | 8/2019 | Takahashi | ............... | B62D 21/15 |
| 10,640,154 B2* | 5/2020 | Takii | ....................... | B62D 65/02 |
| 10,661,840 B1* | 5/2020 | Saje | ................... | B62D 25/2018 |
| 11,608,115 B2* | 3/2023 | Kim | ..................... | B62D 21/152 |
| 11,654,968 B2* | 5/2023 | Woo | ....................... | B62D 21/12 |
| | | | | 296/203.01 |
| 11,667,182 B2* | 6/2023 | Woo | ......................... | B60K 1/04 |
| | | | | 180/68.5 |
| 11,713,079 B2* | 8/2023 | Woo | ................... | B62D 25/2018 |
| | | | | 280/781 |
| 11,772,705 B2* | 10/2023 | Kang | ................... | B62D 21/157 |
| | | | | 180/271 |
| 2018/0162448 A1 | 6/2018 | Takahashi | | |
| 2023/0062143 A1* | 3/2023 | Zandbergen | ............ | B60L 50/64 |
| 2023/0264744 A1* | 8/2023 | Kim | ..................... | B62D 27/065 |
| | | | | 296/204 |

FOREIGN PATENT DOCUMENTS

| | | |
|---|---|---|
| JP | 2000-103356 A | 4/2000 |
| KR | 10-2009-0109752 A | 10/2009 |
| WO | 2013/150245 A1 | 10/2013 |

* cited by examiner

CHASSIS PLATFORM MODULE FOR ELECTRIC VEHICLE

CROSS-REFERENCE TO RELATED APPLICATION

This application claims the benefit under 35 U.S.C. § 119(a) of Korean Patent Application No. 10-2020-0110896, filed on Sep. 1, 2020 in the Korean Intellectual Property Office, the entire disclosure of which is incorporated herein by reference for all purposes.

BACKGROUND

Field

Exemplary embodiments of the present disclosure relate to a chassis platform module for an electric vehicle, and more particularly, to a chassis platform module for an electric vehicle, which can improve the assembly performance between members.

Discussion of the Background

In general, an electric vehicle refers to a vehicle which uses electricity as power. Specifically, the electric vehicle does not acquire driving energy from combustion of fossil fuel, but acquires driving energy by rotating a motor with electricity stored in a battery.

Since the electric vehicle neither uses fossil fuel nor discharges carbon dioxide or nitrogen oxide during driving, the electric vehicle is eco-friendly. Furthermore, when the electric vehicle is driven only by an electric motor, the electric vehicle can be operated at low operation cost, and thus has an advantage in an economic aspect.

Such an electric vehicle has a structure in which a battery is detachably installed at the bottom of the body of the vehicle, and a front wheel chassis module and a rear wheel chassis module, on which the wheels of the vehicle are installed, are also installed at the bottom of the body of the vehicle. The electric vehicle includes a frame part on which the battery is mounted and a support part coupled to each of the front and rear of the frame part. The frame part and the support parts are formed by assembling a plurality of members through a connector, the plurality of members being made of an extruded material or the like.

Such a structure according to the related art has no separate component on which the connector is placed when assembled to the plurality of members. Thus, an operator applies an adhesive and then fastens a bolt member or the like, with the connector held at specific positions of the members by one hand of the operator. In this case, the position to which the connector is assembled may be varied, depending on an operator.

Furthermore, when a position fixing jig is separately manufactured in order to fix the position of the connector, a process of manufacturing the jig is added to cause an additional cost.

The related art of the present disclosure is disclosed in Korean Patent Application Laid-Open No. 2009-0109752 published on Oct. 21, 2009 and entitled "Chassis Frame of Vehicle".

SUMMARY

Various embodiments are directed to a chassis platform module for an electric vehicle, through which a connector part is assembled at a predetermined position when the connector part is assembled.

Also, various embodiments are directed to a chassis platform module for an electric vehicle, which can uniformize the assembly position of a connector part to implement consistent adhesion performance, and reduce assembly variation for each product.

Also, various embodiments are directed to a chassis platform module for an electric vehicle, which can secure the same durability, strength and rigidity for each product, secure the uniqueness of the shape of a chassis platform module, and improve the quality of an external appearance.

In an embodiment, a chassis platform module for an electric vehicle may include: a frame part having a battery module coupled thereto, and including a plurality of members assembled to each other; a first support part extending from one side of the frame part in a longitudinal direction thereof, having a front wheel chassis module mounted thereon, and including a connection member assembled to the frame part; a second support part extending from another side of the frame part in the longitudinal direction thereof, and having a rear wheel chassis module mounted thereon; and a connector part including a plurality of connector members assembled between the plurality of members of the frame part or assembled to the frame part and the first support part so as to connect the plurality of members and the connection member. The connection member and the plurality of members of the frame part may include guide protrusions respectively configured to place the plurality of connector members on surfaces of the connection member and the plurality of members, which are assembled to the plurality of connector members, such that the connector part is assembled at predetermined positions of the first support part and the frame part when assembled to the first support part and the frame part.

The frame part may include: a battery cross member disposed on one side of the battery module in a longitudinal direction thereof, and connected to the first support part; a pair of battery side members disposed on both sides of the battery module in a widthwise direction thereof, and connected to the battery cross member; and a corner member connected to and extending diagonally between the battery cross member and each of the battery side members.

The first support part may further include a first support body having a bottom side connected to the front wheel chassis module and a top side connected to a body of a vehicle. The connection member may be connected to the first support body and the battery cross member.

The corner member may include a corner body and a pair of first corner guide protrusions respectively located at a top and a bottom of a first corner guide surface which is a surface of the corner body, facing the battery module, the battery cross member may include a cross body and a pair of cross guide protrusions respectively located at a top and a bottom of a cross guide surface which is a surface of the cross body, facing the battery module, and the connector part may include a first connector member which is brought into surface contact with the first corner guide surface and the cross guide surface, supported by the first corner guide protrusion and the cross guide protrusion when assembled to the frame part, and guided to the predetermined position of the frame part.

The first connector member may include: a first body including a first assembly surface brought into surface contact with an end of the corner body, facing the battery cross member, and a second assembly surface brought into surface contact with the cross guide surface; a first coupling part protruding from the first body toward the corner body, fitted into the pair of first corner guide protrusions, and coupled to the first corner guide surface; and a second coupling part protruding from the first body, fitted into the pair of cross guide protrusions, and coupled to the cross guide surface.

The corner member may further include a pair of second corner guide protrusions respectively located at a top and a bottom of a second corner guide surface which is an opposite surface to the first corner guide surface. The connection member may include a connection body and a connection guide protrusion located on a connection guide surface disposed on one side of the connection body. The connector part may further include a second connector member which is brought into surface contact with the second corner guide surface and the connection guide surface, and supported by the second corner guide protrusion and the connection guide protrusion and guided to the predetermined position of the first support part, when the frame part and the first support part are assembled to each other.

The second connector member may include: a second body including a third assembly surface facing the second corner guide surface and a fourth assembly surface facing the connection guide surface; a third coupling part including a surface protruding from the second body and extending from the third assembly surface, and fitted between the pair of second corner guide protrusions and coupled to the second corner guide surface; and a fourth coupling part including a surface protruding from the second body and extending from the fourth assembly surface, and placed on a connection guide protrusion and coupled to the connection guide surface.

The corner member may include: a corner body; a pair of first corner guide protrusions respectively located at a top and a bottom of a first corner guide surface which is a surface of the corner body, facing the battery module; and a pair of second corner guide protrusions respectively located at a top and a bottom of a second corner guide surface which is an opposite surface to the first corner guide surface. The connector part may include a third connector member configured to assemble the battery side member and the corner member to each other, and fitted between the pair of first corner guide protrusions and between the pair of second corner guide protrusions and coupled to the corner member.

The third connector member may include: a third body including a fifth assembly surface brought into surface contact with an end of the corner body, facing the battery side member, and a sixth assembly surface brought into surface contact with an end of the battery side member, facing the corner body; a fifth coupling part protruding from the third body toward the corner body, and fitted to the pair of first corner guide protrusions and coupled to the first corner guide surface; and a sixth coupling part protruding from the third body toward the corner body, and fitted to the pair of second corner guide protrusions and coupled to the second corner guide surface.

In the chassis platform module for an electric vehicle in accordance with the embodiment of the present disclosure, the frame part and the first support part assembled to the frame part may include the guide protrusions to assemble the connector part at the predetermined position, when the connector part is assembled.

Thus, in accordance with the embodiment of the present disclosure, the assembly positions of the connector part may be uniformized to implement the consistent adhesion performance during the assembly process, which makes it possible to reduce assembly variation for each product Furthermore, when the chassis platform module in accordance with the present disclosure is used, it is possible to secure the same durability, strength and rigidity for each product, to secure the uniqueness of the shape of the chassis platform module, and to improve the quality of the external appearance of a product.

DETAILED DESCRIPTION OF THE ILLUSTRATED EMBODIMENTS

Hereafter, embodiments of the present disclosure will be described in detail with reference to the accompanying drawings.

First, the following embodiments are embodiments suitable for promoting understandings of the technical features of a chassis platform module for an electronic vehicle in accordance with the present disclosure. However, the present disclosure is not limited to the following embodiments, the technical features of the present disclosure are not limited by the following embodiments, and the present disclosure can be modified in various manners without departing from the scope of the present disclosure.

Figure 1:
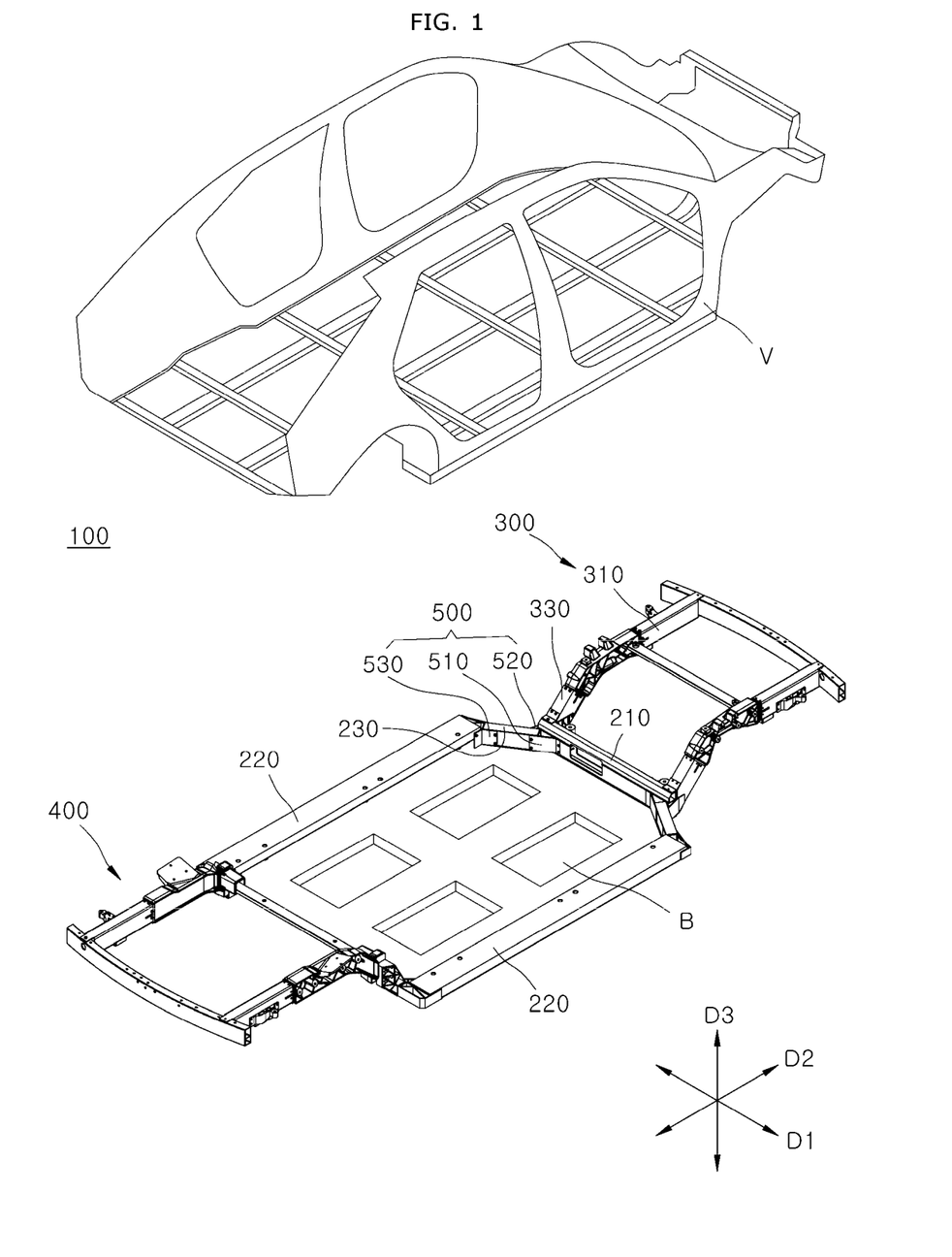
FIG. 1 is a perspective view illustrating a chassis platform module for an electric vehicle in accordance with an embodiment of the present disclosure.
Figure 2:
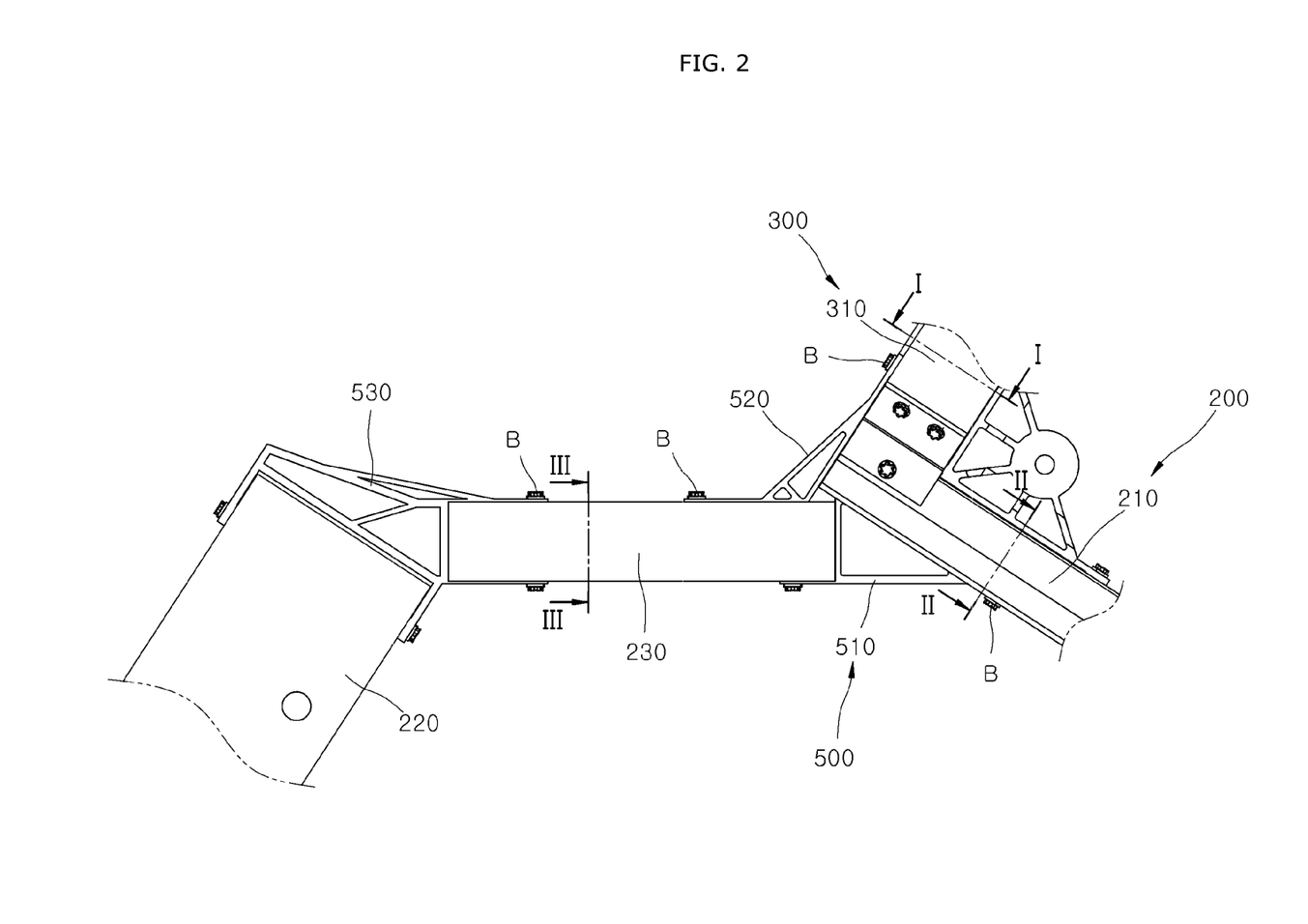
FIG. 2 is an expanded top view of a portion of FIG. 1.
Figure 3:
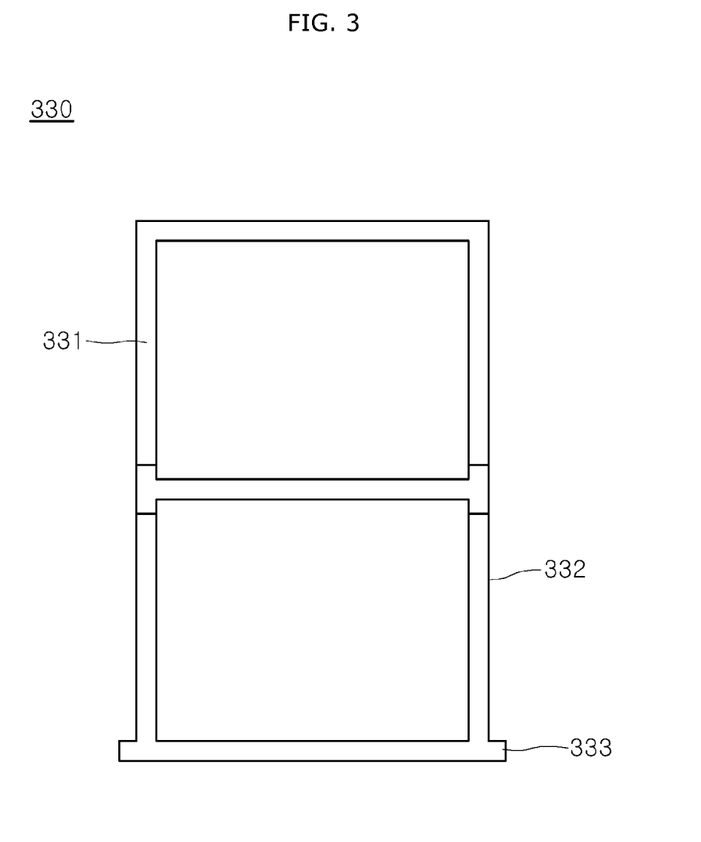
FIG. 3 is a cross-sectional view taken along line I-I of FIG. 2, illustrating a connection member in accordance with the embodiment of the present disclosure.
Figure 4:
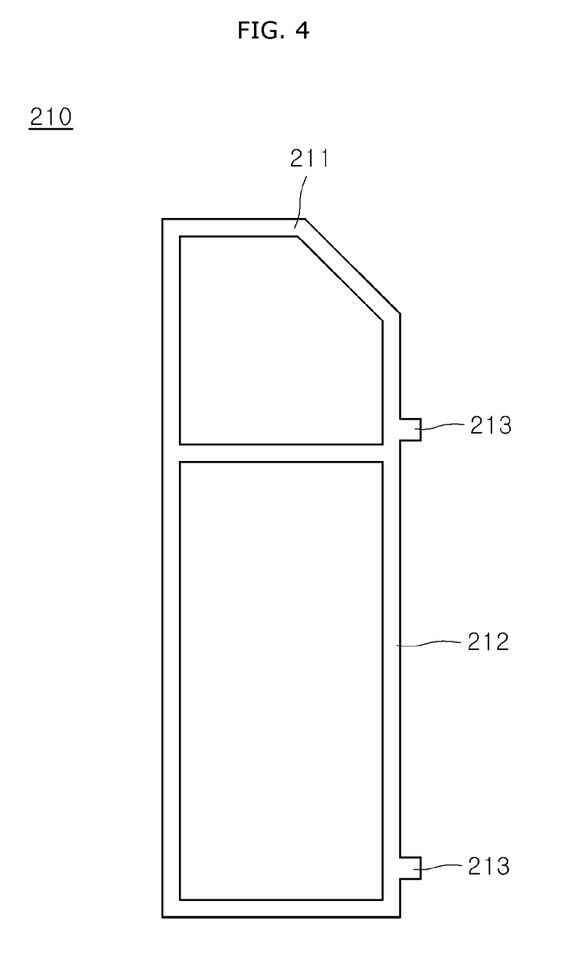
FIG. 4 is a cross-sectional view taken along line II-II of FIG. 2, illustrating a battery cross member in accordance with the embodiment of the present disclosure.
Figure 5:
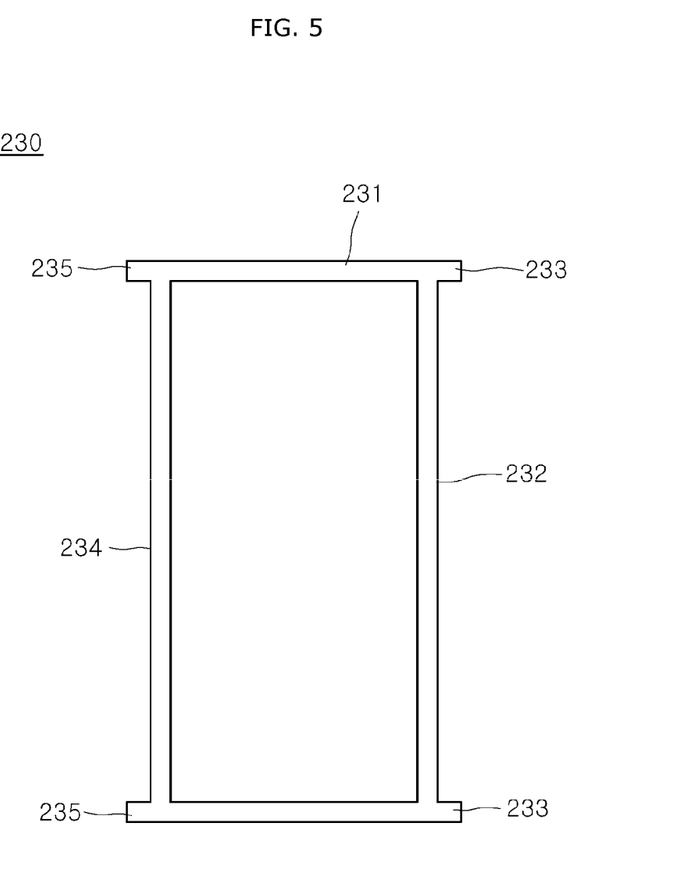
FIG. 5 is a cross-sectional view taken along the III-III of FIG. 2, illustrating a corner member in accordance with the embodiment of the present disclosure.

FIG. 1 is a perspective view illustrating a chassis platform module for an electric vehicle in accordance with an embodiment of the present disclosure, FIG. 2 is an expanded top view of a portion of FIG. 1, FIG. 3 is a cross-sectional view taken along line I-I of FIG. 2, illustrating a connection member in accordance with the embodiment of the present disclosure, FIG. 4 is a cross-sectional view taken along line II-II of FIG. 2, illustrating a battery cross member in accordance with the embodiment of the present disclosure, FIG. 5 is a cross-sectional view taken along the III-III of FIG. 2, illustrating a corner member in accordance with the embodiment of the present disclosure.

Figure 6:
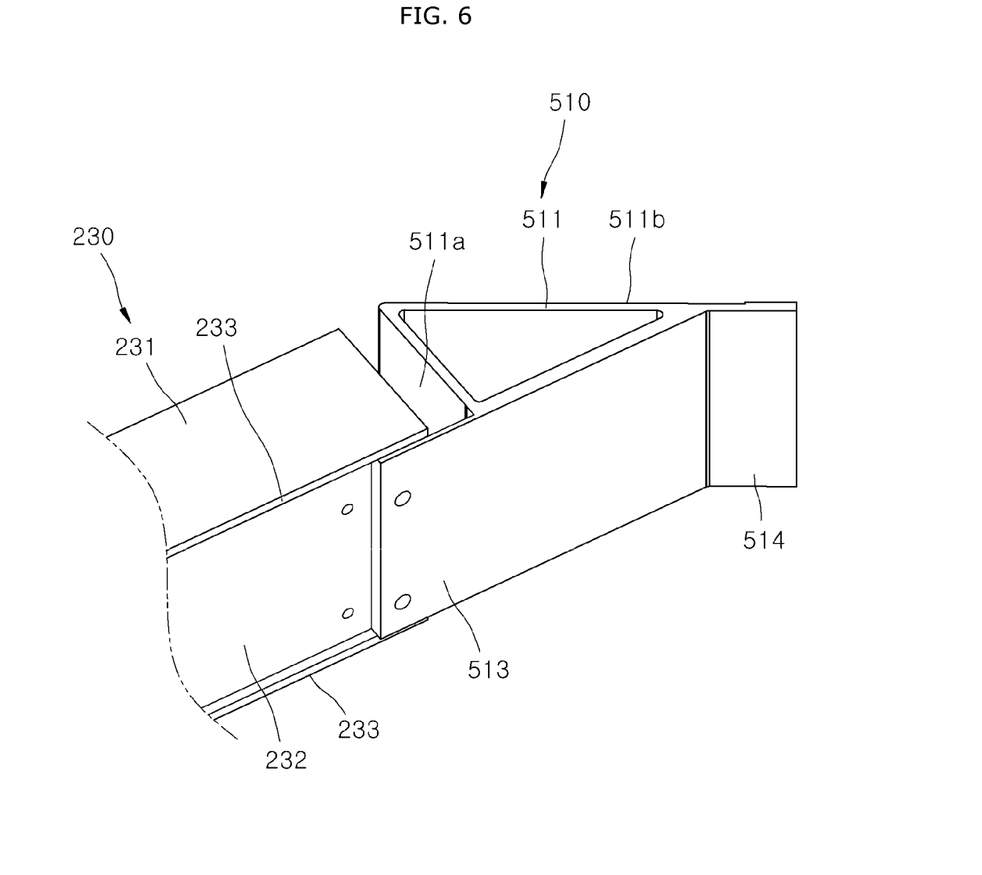
FIG. 6 is a perspective view illustrating a process of assembling the corner member and a first connector member in accordance with the embodiment of the present disclosure.
Figure 7:
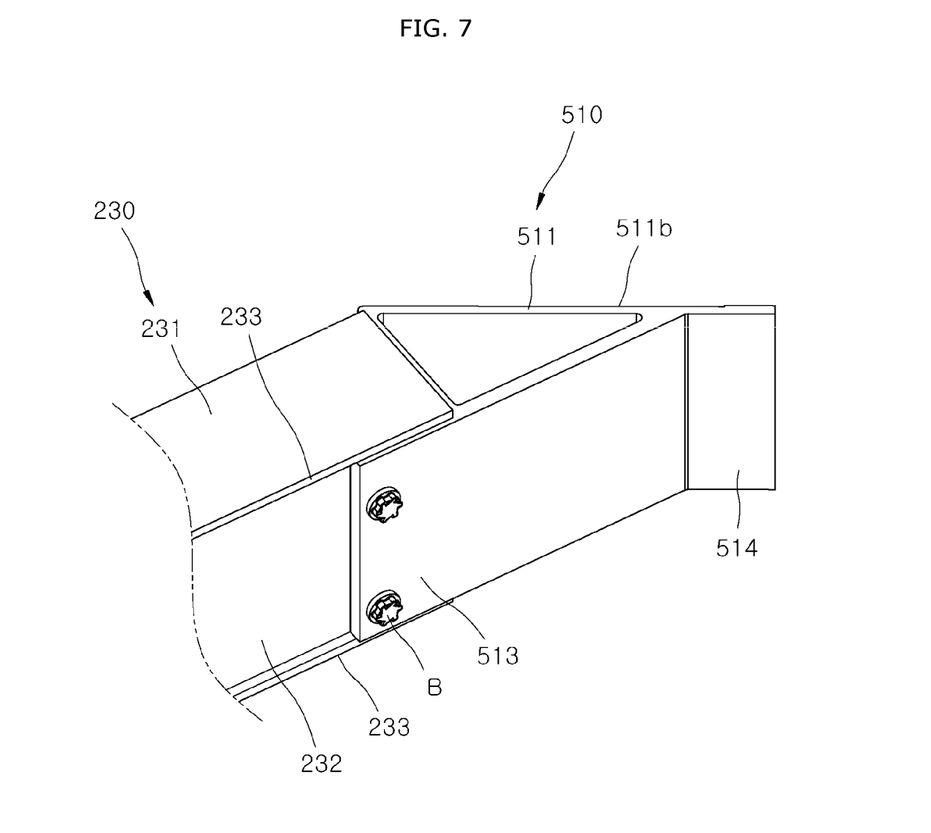
FIG. 7 is a perspective view illustrating that the corner member and the first connector member in accordance with the embodiment of the present disclosure are assembled.
Figure 8:
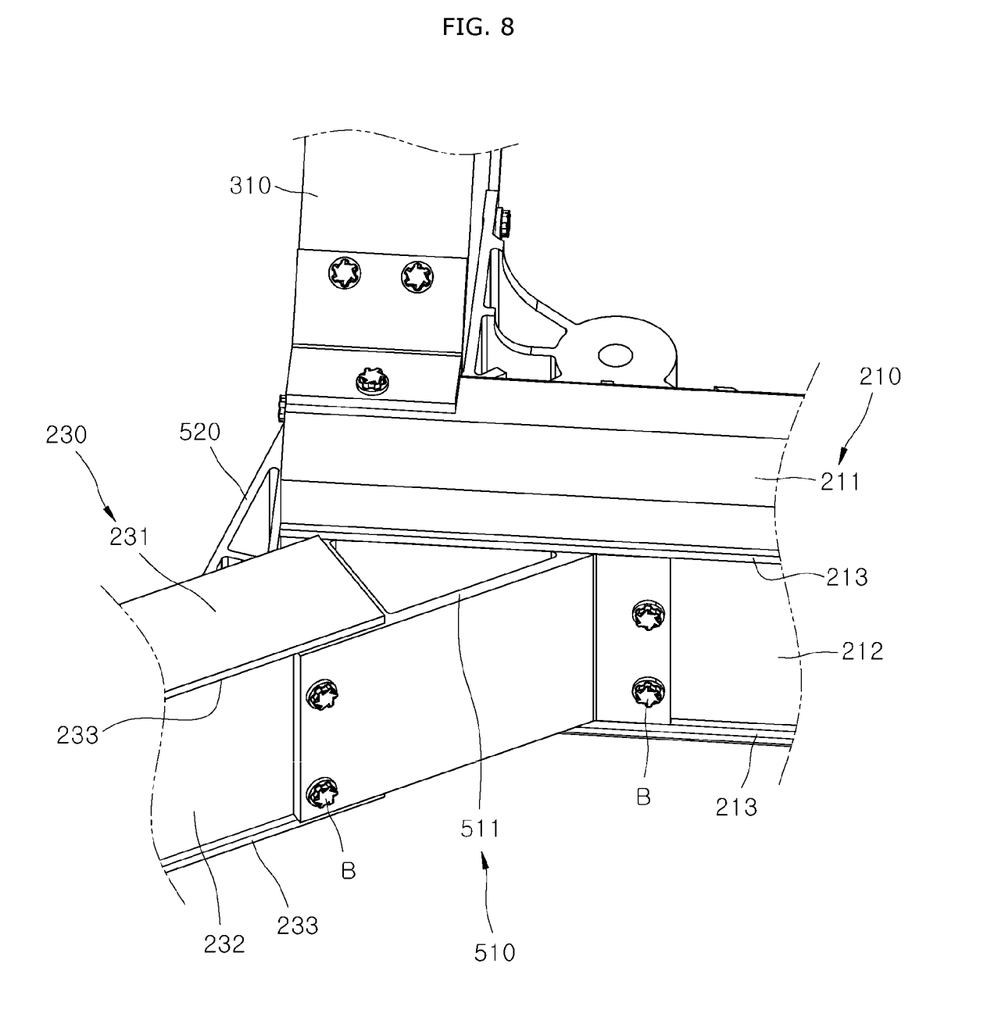
FIG. 8 is a diagram illustrating that the first connector member in accordance with the embodiment of the present disclosure is assembled to the battery cross member.
Figure 9:
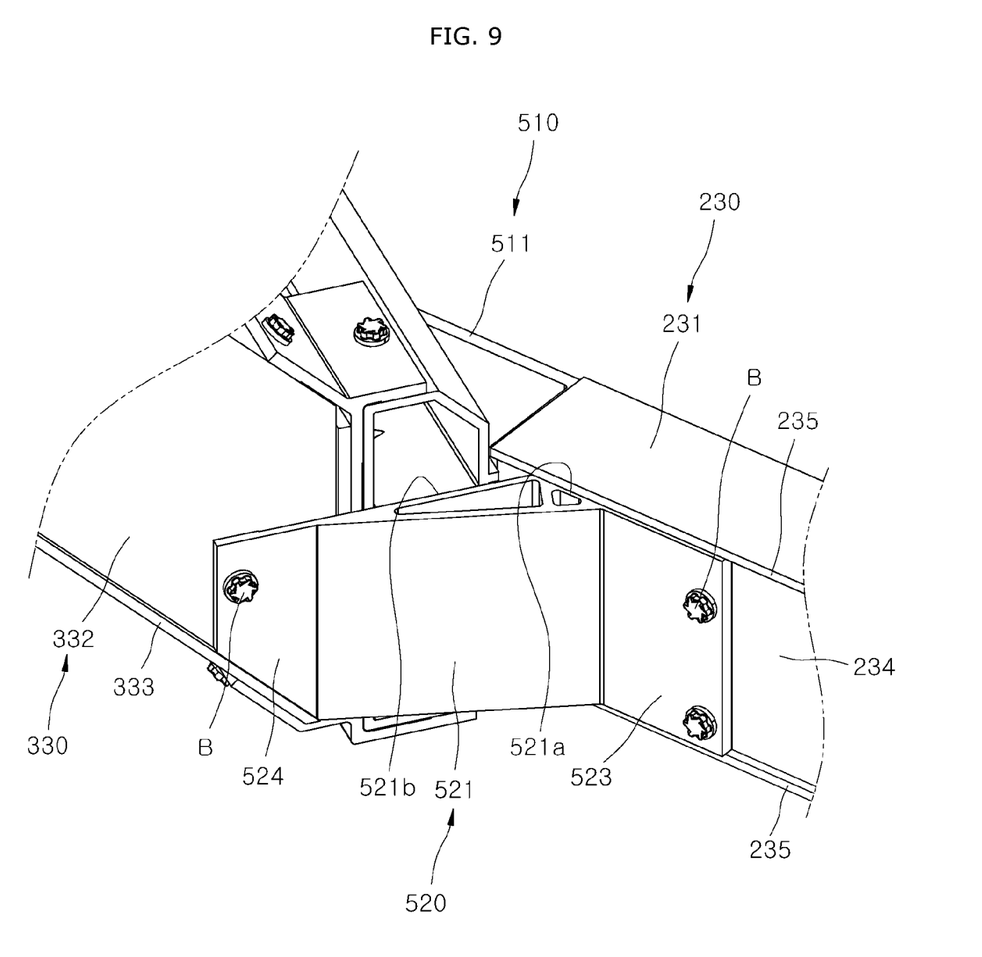
FIG. 9 is a diagram illustrating that a second connector member in accordance with the embodiment of the present disclosure is assembled to the connection member and the corner member.
Figure 10:
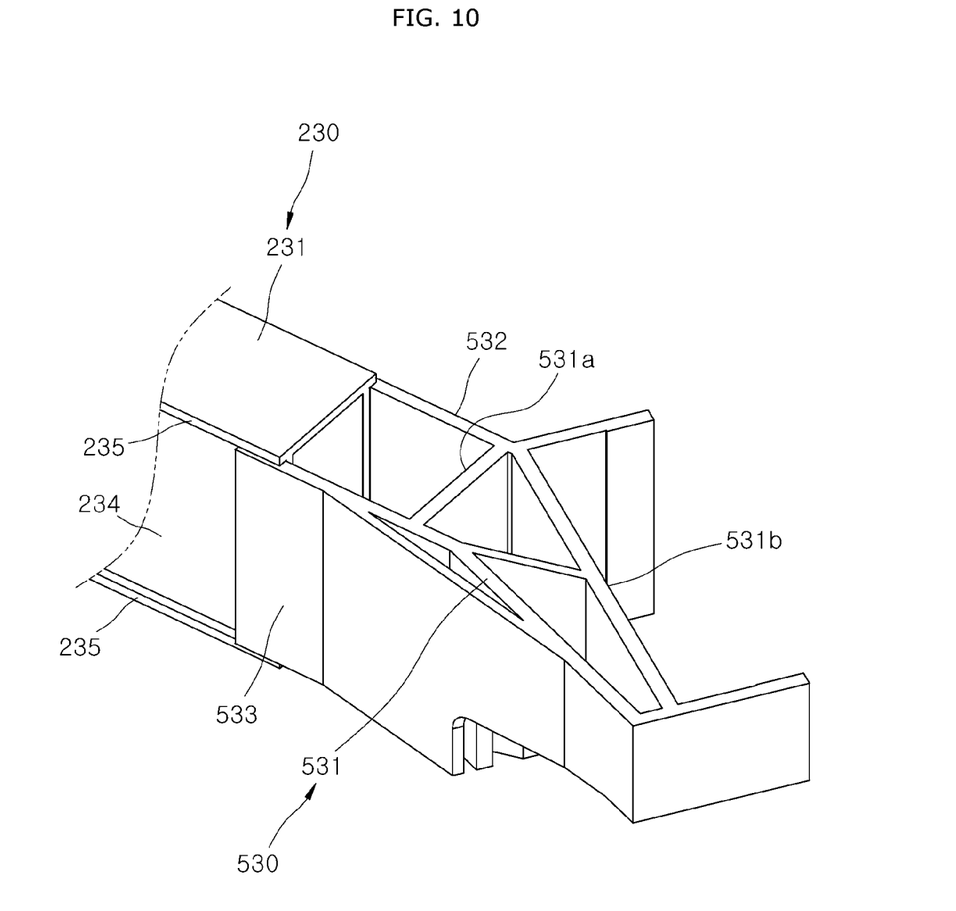
FIG. 10 is a perspective view illustrating a process of assembling a third connector member and the corner member in accordance with the embodiment of the present disclosure.
Figure 11:
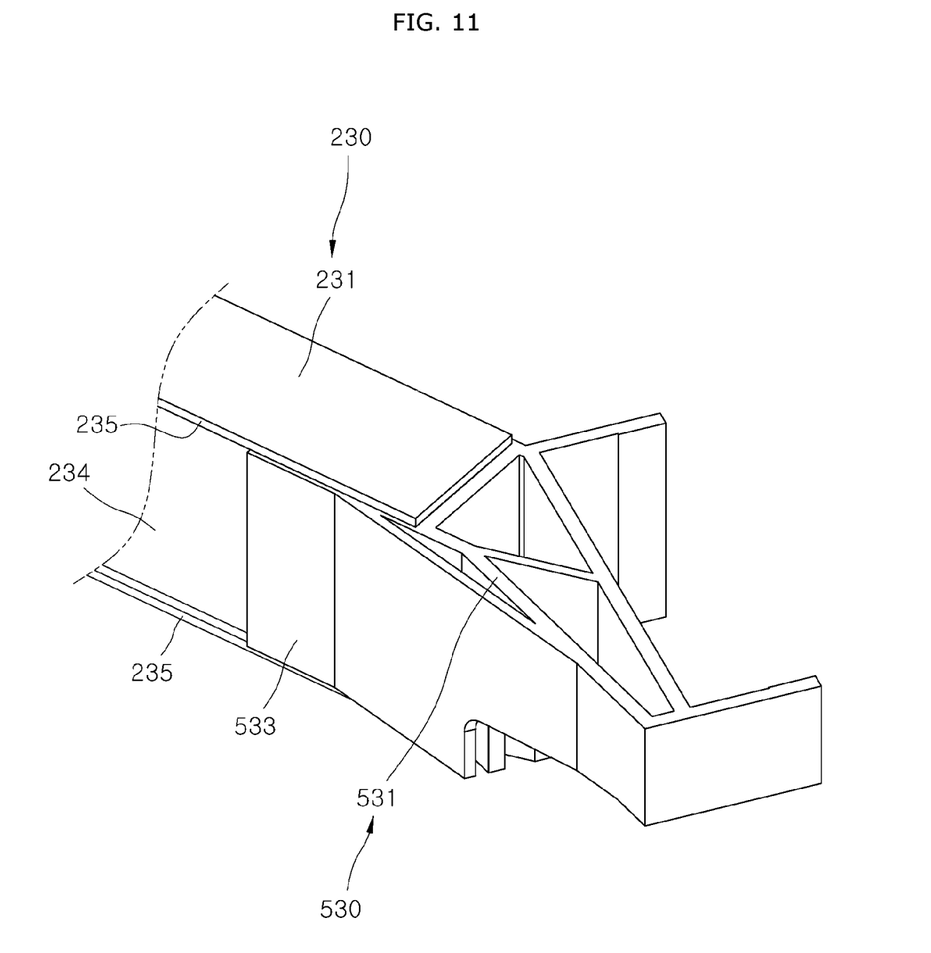
FIG. 11 is a perspective view illustrating that the third connector member in accordance with the embodiment of the present disclosure is assembled to the corner member.

FIG. 6 is a perspective view illustrating a process of assembling the corner member and a first connector member in accordance with the embodiment of the present disclosure, FIG. 7 is a perspective view illustrating that the corner member and the first connector member in accordance with the embodiment of the present disclosure are assembled, FIG. 8 is a diagram illustrating that the first connector member in accordance with the embodiment of the present disclosure is assembled to the battery cross member, FIG. 9 is a diagram illustrating that a second connector member in accordance with the embodiment of the present disclosure is assembled to the connection member and the corner member, FIG. 10 is a perspective view illustrating a process of assembling a third connector member and the corner member in accordance with the embodiment of the present disclosure, and FIG. 11 is a perspective view illustrating that the third connector member in accordance with the embodiment of the present disclosure is assembled to the corner member.

Referring to FIGS. 1 to 11, a chassis platform module 100 in accordance with an embodiment of the present disclosure includes a frame part 200, a first support part 300, a second support part 400 and a connector part 500.

The frame part 200 has a battery module (B) coupled thereto, and includes a plurality of members assembled to each other. Specifically, the frame part 200 may be configured by assembling the plurality of members, and the battery module (B) may be detachably assembled to the frame part 200.

The first support part 300 includes a connection member 330 which extends from one side of the frame part 200 in a longitudinal direction thereof, has a front wheel chassis module mounted thereon, and is assembled to the frame part 200. The second support part 400 extends from the other side of the frame part 200 in the longitudinal direction thereof, and has a rear wheel chassis module mounted thereon.

Specifically, the first support part 300 may be coupled to the front side of the vehicle, corresponding to the one side of the frame part 200 in the longitudinal direction thereof. The second support part 400 may be coupled to the rear side of the vehicle, corresponding to the other side of the frame part 200 in the longitudinal direction thereof.

The front wheel chassis module may be detachably assembled to the first support part 300, and the rear wheel chassis module may be detachably assembled to the second support part 400. Such a structure may facilitate a part replacement and maintenance operation. The chassis platform module 100 for an electric vehicle in accordance with the embodiment of the present disclosure may be coupled to the body (V) of the vehicle, with the battery modules assembled to the front and rear chassis modules, thereby providing a structure suitable for securing a passenger space and mounting the vehicle body (V).

The connector part 500 includes a plurality of connector members 510, 520 and 530 which are assembled between the plurality of members included in the frame part 200 or assembled to the frame part 200 and the first support part 300 so as to connect the plurality of members and the connection member 330.

Specifically, the connector part 500 may include the plurality of connector members, and each of the connector members may connect the connection member 330 and the corresponding member of the frame part 200 or connect the plurality of members constituting the frame part 200. The connector member may be assembled to the connection member 330 and the frame part 200 through an adhesive member and/or a coupling member B such as a bolt.

The frame part 200 and the first and second support parts 300 and 400 may be made of an aluminum extruded material. Furthermore, the connector part 500 may be provided as an aluminum extruded material formed in a shape corresponding to the connection portion between the respective portions of the frame part 200 and the connection member 330. However, the materials of the frame part 200, the first support part 300 and the connector part 500 and the forming method thereof are not limited to the above-described materials and method.

The plurality of members included in the frame part 200 and the connection member 330 may include guide protrusions provided to place the plurality of connector members on surfaces thereof, which are assembled to the connector members, such that the connector part 500 is assembled at predetermined positions of the first support part 300 and the frame part 200 when assembled to the first support part 300 and the frame part 200.

Specifically, the plurality of members included in the frame part 200 and the connection member 330 may include the guide protrusions formed perpendicular to the surfaces to which the connector members are assembled. The guide protrusions may be elongated in the longitudinal directions of the respective members.

Furthermore, the guide protrusions may be formed on the surfaces of the respective members in consideration of the assembly positions of the connector members. When the connector part 500 is assembled to the respective members, the connector members may be supported by the guide protrusions and thus guided to the predetermined positions, while brought into surface contact with the surfaces to which the respective members are assembled. That is, the guide protrusions may serve to hold the positions of the connector members, when the connector members are assembled.

As such, the chassis platform module 100 for an electric vehicle in accordance with the embodiment of the present disclosure may include the guide protrusions formed on the frame part 200 and the first support part 300 assembled to the frame part 200. Thus, when the connector part 500 is assembled, the connector part 500 may be assembled at the predetermined positions.

Thus, in accordance with the embodiment of the present disclosure, the assembly positions of the connector part 500 may be uniformized to implement the consistent adhesion performance during the assembly process, which makes it possible to reduce assembly variation for each product. Specifically, when the frame part 200 and the first support part 300 have no guide protrusions, it indicates that there are no components which limit the position of the connector part 500, and fix the position of the connector part 500 in case that the connector part 500 is assembled. Therefore, the position at which the connector part 500 is assembled may be varied depending on an operator. Furthermore, when a separate fixing jig is used to limit and fix the position of the connector part 500, an additional cost may occur. In accordance with the embodiment of the present disclosure, the structure having the guide protrusions may be reflected to remove such a problem.

Furthermore, when the chassis platform module in accordance with the embodiment of the present disclosure is used, it is possible to secure the same durability, strength and rigidity for each product, to secure the uniqueness of the shape of the chassis platform module, and to improve the quality of the external appearance of a product.

The frame part 200 may include a battery cross member 210, a battery side member 220 and a corner member 230.

The battery cross member 210 may be provided on one side of a battery module (B) in a longitudinal direction thereof, and connected to the first support part 300. That is, the battery cross member 210 may be disposed at the front of the battery module (B) in the widthwise direction of the vehicle. The frame part 200 may include a rear wheel-side cross member which is parallel to the battery cross member 210 and coupled to the second support part 400.

Specifically, the first support part 300 may further include a first support body 310 having a bottom side connected to the front wheel chassis module and a top side connected to the body (V) of the vehicle. The connection member 330 may be connected to the first support body 310 and the battery cross member 210.

The battery side member 220 may be provided as a pair of members on both sides of the battery module (B) in the widthwise direction thereof, and connected to the battery cross member 210.

The corner member 230 may be connected between the battery cross member 210 and the battery side member 220, and disposed diagonally to the battery cross member 210 and the battery side member 220. The corner member 230 may be formed to have the same height as the battery cross member 210 and the battery side member 220, and coupled to the battery cross member 210 and the battery side member 220, while forming a predetermined angle.

The frame part 200 may form a space with the battery cross member 210 so as to be coupled to the edge of the battery module (B) by the rear wheel-side cross member, the battery side member 220 and the corner member 230. At this time, the respective members may be assembled through the connector part 500. The shape of the frame part 200 is not limited to the illustrated embodiment, but may be modified in various manners depending on the shape of the battery module (B).

Hereafter, for convenience of description, the side-to-side direction of the vehicle, i.e. the longitudinal direction of the battery cross member 210, will be referred to as a first direction D1, the front-to-rear direction of the vehicle, i.e. the longitudinal direction of the battery side member 220, will be referred to as a second direction D2, and the top-to-bottom direction of the vehicle, i.e. a direction perpendicular to the longitudinal direction of the battery cross member 210, will be referred to as a third direction D3.

Referring to FIGS. 1, 2 and 5, the corner member 230 may include a corner body 231, a first corner guide protrusion 233 and a second corner guide protrusion 235.

The corner body 231 constituting the body of the corner member 230 may be assembled diagonally to the battery cross member 210 and the battery side member 220. The corner body 231 may include a first corner guide surface 232 facing the battery module (B) and a second corner guide surface 234 facing the opposite direction of the first corner guide surface 232.

The first corner guide protrusion 233 may be provided as a pair of protrusions formed at the top and bottom of the first corner guide surface 232, respectively. The second corner guide protrusion 235 may be provided as a pair of protrusions formed at the top and bottom of the second corner guide surface 234, respectively.

Referring to FIGS. 1, 2 and 4, the battery cross member 210 may include a cross body 211 and a pair of cross guide protrusions 213 formed at the top and bottom of a cross guide surface 212 which is a surface of the cross body 211, facing the battery module (B). Specifically, the cross body 211 may include the cross guide surface 212 disposed in the first direction D1 and facing the battery module (B). The pair of cross guide protrusions 213 may be formed at the top and bottom of the cross guide surface 212 so as to protrude toward the battery module (B), and elongated in the first direction D1.

Referring to FIGS. 1, 2 and 3, the connection member 330 may include a connection body 331 and a connection guide protrusion 333 protruding from a connection guide surface 332 formed on one side of the connection body 331.

Specifically, the connection body 331 may be disposed in the second direction D2, inclined upward toward the first support body 310, and provided as a pair of bodies at both ends of the battery cross member 210. The connection guide surface 332 may be a surface facing the outside of the connection body 331.

The connector part 500 may include a first connector member 510, a second connector member 520 and a third connector member 530.

Referring to FIGS. 6 to 8, the first connector member 510 may be brought into surface contact with the first corner guide surface 232 and the cross guide surface 212, supported by the first corner guide protrusion 233 and the cross guide protrusion 213 when assembled to the frame part 200, and guided to the predetermined position of the frame part 200.

Specifically, the first connector member 510 may include a first body 511, a first coupling part 513 and a second coupling part 514.

The first body 511 may include a first assembly surface 511a brought into surface contact with an end of the corner body 231, facing the battery cross member 210, and a second assembly surface 511b brought into surface contact with the cross guide surface 212. At this time, the first and second assembly surfaces 511a and 511b may be diagonally formed to couple the corner body 231 diagonally to the battery cross member 210.

The first coupling part 513 may be formed to protrude from the first body 511 toward the corner body 231, and fitted into the pair of first corner guide protrusions 233 and coupled to the first corner guide surface 232.

Specifically, during the assembly process, the first coupling part 513 may be fitted between the pair of first corner guide protrusions 233, thereby suppressing the first connector member 510 from moving in the third direction D3. Furthermore, during the assembly process, one surface of the first coupling part 513 may be brought into surface contact with the first corner guide surface 232, which makes it possible to prevent the first connector member 510 from moving in a direction perpendicular to the first corner guide surface 232 (see FIG. 6).

Then, the first assembly surface 511a may be seated on the end surface of the corner body 231, which makes it possible to prevent the first connector member 510 from moving in the longitudinal direction of the corner body 231. With the first assembly surface 511a seated on the end surface of the corner body 231, the corner member 230 and the first connector member 510 may be assembled to each other through the adhesive member and the coupling member B.

The assembly of the corner member 230 and the first connector member 510 may be coupled to the battery cross member 210 assembled to the connection member 330 of the first support part 300. The second coupling part 514 may be formed to protrude from the first body 511, and fitted into the pair of cross guide protrusions 213 and coupled to the cross guide surface 212.

Specifically, during the assembly process, the second coupling part 514 may be fitted between the pair of second corner guide protrusions 235, thereby suppressing the second connector member 520 from moving in the third direction D3. Furthermore, during the assembly process, one surface of the second coupling part 514 and the second assembly surface 511b may be brought into surface contact with the cross guide surface 212, which makes it possible to suppress the first connector member 510 from moving in the second direction D2 perpendicular to the cross guide surface 212. At this time, the assembly of the corner member 230 and the first connector member 510 may be allowed to move in the first direction D1.

In the above-described coupling structure, the first connector member 510 may be assembled to the predetermined positions of the corner body 231 and the battery cross member 210, which makes it possible to acquire the consistent assembly shape of the corner body 231 and the battery cross member 210.

Referring to FIG. 9, the second connector member 520 may be brought into surface contact with the second corner guide surface 234 and the connection guide surface 332, supported by the second corner guide protrusion 235 and the connection guide protrusion 333 when the frame part 200 and the first support part 300 are assembled, and guided to the predetermined position of the first support part 300.

Specifically, the second connector member 520 may include a second body 521, a third coupling part 523 and a fourth coupling part 524.

The second body 521 may include a third assembly surface 521a facing the second corner guide surface 234 and a fourth assembly surface 521b facing the connection guide surface 332. The third and fourth assembly surfaces 521a and 521b may be provided to form an angle corresponding to the angle between the connection member 330 and the corner member 230.

The third coupling part 523 may include a surface protruding from the second body 521 and extending from the third assembly surface 521a. The third coupling part 523 may be fitted between the pair of second corner guide protrusions 235, and coupled to the second corner guide surface 234.

Specifically, during the assembly process, the third coupling part 523 may be fitted between the pair of second corner guide protrusions 235, thereby suppressing the second connector member 520 from moving in the third direction D3. Furthermore, during the assembly process, one surface of the second coupling part 514 may be brought into surface contact with the second corner guide surface 234, which makes it possible to suppress the second connector member 520 from moving in a direction perpendicular to the second corner guide surface 234.

The fourth coupling part 524 may include a surface protruding from the second body 521 and extended from the fourth assembly surface 521b. The fourth coupling part 524 may be placed on the connection guide protrusion 333 and coupled to the connection guide surface 332.

Since the connection body 331 is inclined upward, the connection guide protrusion 333 may also be inclined upward. The fourth coupling part 524 whose bottom is placed on the connection guide protrusion 333 may be formed diagonally so that the bottom thereof corresponds to the shape of the connection guide protrusion 333.

As the fourth coupling part 524 is brought into surface contact with the connection guide surface 332, the second connector member 520 may be suppressed from moving in the side-to-side direction of the vehicle, i.e. the first direction D1. Furthermore, the connection guide protrusion 333 may suppress the second connector member 520 from moving in the front-to-rear direction of the vehicle, i.e. the second direction D2.

With the above-described coupling structure, the second connector member 520 may be assembled to the predetermined positions of the corner body 231 and the connection member 330, which makes it possible to acquire the consistent assembly shape of the corner member 230 and the connection member 330.

Referring to FIGS. 10 and 11, the third connector member 530 may assemble the battery side member 220 and the corner member 230. During the assembly process, the third connector member 530 may be fitted between the pair of first corner guide protrusions 233 and the pair of second corner guide protrusions 235, and coupled to the corner member 230.

Specifically, the third connector member 530 may include a third body 531, a fifth coupling part 532 and a sixth coupling part 533.

The third body 531 may include a fifth assembly surface 531a brought into surface contact with an end of the corner body 231, facing the battery side member 220, and a sixth assembly surface 531b brought into surface contact with an end of the battery side member 220, facing the corner body 231.

The fifth coupling part 532 may be formed to protrude from the third body 531 toward the corner body 231, and fitted into the pair of first corner guide protrusions 233 and coupled to the first corner guide surface 232. The sixth coupling part 533 may be formed to protrude from the third body 531 toward the corner body 231, and fitted into the pair of second corner guide protrusions 235 and coupled to the second corner guide surface 234.

That is, the fifth and sixth coupling parts 532 and 533 may be formed in parallel to each other, and brought into surface contact with the first and second corner guide surfaces 232 and 234, respectively. During the assembly process, the fifth coupling part 532 may be fitted between the pair of first corner guide protrusions 233, and the sixth coupling part 533 may be fitted between the pair of second corner guide protrusions 235. Thus, the third connector member 530 may be suppressed from moving in the first, second and third directions D1, D2 and D3.

With the above-described coupling structure, the third connector member 530 may be assembled to the predetermined position of the corner body 231, which makes it possible to acquire the consistent assembly shape of the corner member 230 and the battery side member 220. The battery side member 220 may also be manufactured to have guide protrusions to fix the position to which the third connector member 530 is assembled.

In the chassis platform module for an electric vehicle in accordance with the embodiment of the present disclosure, the frame part and the first support part assembled to the frame part may include the guide protrusions to assemble the connector part at the predetermined positions of the frame part and the first support part, when the connector part is assembled to the frame part and the first support part.

Thus, in accordance with the embodiment of the present disclosure, the assembly positions of the connector part may be uniformized to implement the consistent adhesion performance during the assembly process, which makes it possible to reduce assembly variation for each product Furthermore, when the chassis platform module in accordance with the embodiment of the present disclosure is used, it is possible to secure the same durability, strength and rigidity for each product, to secure the uniqueness of the shape of the chassis platform module, and to improve the quality of the external appearance of a product.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A chassis platform module for an electric vehicle, comprising:
   a frame part having a battery module coupled thereto, and including a plurality of members assembled to each other;
   a first support part extending from one side of the frame part in a longitudinal direction thereof, having a front wheel chassis module mounted thereon, and including a connection member assembled to the frame part;
   a second support part extending from another side of the frame part in the longitudinal direction thereof, and having a rear wheel chassis module mounted thereon; and
   a connector part including a plurality of connector members assembled between the plurality of members of the frame part or assembled to the frame part and the first support part so as to connect the plurality of members to the connection member,
   wherein the connection member and the plurality of members of the frame part include guide protrusions respectively configured to place the plurality of connector members on surfaces of the connection member and the plurality of members, which are assembled to the plurality of connector members, such that the connector part is assembled at predetermined positions of the first support part and the frame part when assembled to the first support part and the frame part,
   wherein the frame part comprises:
   a battery cross member disposed on one side of the battery module in a longitudinal direction thereof, and connected to the first support part;
   a pair of battery side members disposed on both sides of the battery module in a widthwise direction thereof, and connected to the battery cross member; and
   a corner member connected to and extending diagonally between the battery cross member and each of the pair of battery side members.

2. The chassis platform module of claim 1, wherein the first support part further includes a first support body having a bottom side connected to the front wheel chassis module and a top side connected to a body of the electric vehicle,
   wherein the connection member is connected to the first support body and the battery cross member.

3. The chassis platform module of claim 2, wherein the corner member comprises a corner body and a pair of first corner guide protrusions respectively located at a top and a bottom of a first corner guide surface which is a surface of the corner body, facing the battery module,
   the battery cross member comprises a cross body and a pair of cross guide protrusions respectively located at a top and a bottom of a cross guide surface which is a surface of the cross body, facing the battery module, and
   the connector part comprises a first connector member which is brought into surface contact with the first corner guide surface and the cross guide surface, supported by the first corner guide protrusion and the cross guide protrusion when assembled to the frame part, and guided to the predetermined position of the frame part.

4. The chassis platform module of claim 3, wherein the first connector member comprises:
   a first body including a first assembly surface brought into surface contact with an end of the corner body, facing the battery cross member, and a second assembly surface brought into surface contact with the cross guide surface;
   a first coupling part protruding from the first body toward the corner body, fitted into the pair of first corner guide protrusions, and coupled to the first corner guide surface; and
   a second coupling part protruding from the first body, fitted into the pair of cross guide protrusions, and coupled to the cross guide surface.

5. The chassis platform module of claim 3, wherein the corner member further comprises a pair of second corner guide protrusions respectively located at a top and a bottom of a second corner guide surface which is an opposite surface to the first corner guide surface,
   the connection member comprises a connection body and a connection guide protrusion located on a connection guide surface disposed on one side of the connection body, and
   the connector part further comprises a second connector member which is brought into surface contact with the second corner guide surface and the connection guide surface, and supported by the second corner guide protrusion and the connection guide protrusion and guided to the predetermined position of the first support part, when the frame part and the first support part are assembled to each other.

6. The chassis platform module of claim 5, wherein the second connector member includes:
   a second body including a third assembly surface facing the second corner guide surface and a fourth assembly surface facing the connection guide surface;
   a third coupling part including a surface protruding from the second body and extending from the third assembly surface, and fitted between the pair of second corner guide protrusions and coupled to the second corner guide surface; and
   a fourth coupling part including a surface protruding from the second body and extending from the fourth assembly surface, and placed on a connection guide protrusion and coupled to the connection guide surface.

7. The chassis platform module of claim 2, wherein the corner member comprises:
   a corner body;
   a pair of first corner guide protrusions respectively located at a top and a bottom of a first corner guide surface which is a surface of the corner body, facing the battery module; and
   a pair of second corner guide protrusions respectively located at a top and a bottom of a second corner guide surface which is an opposite surface to the first corner guide surface,
   wherein the connector part comprises a third connector member configured to assemble the battery side member and the corner member to each other, and fitted between the pair of first corner guide protrusions and between the pair of second corner guide protrusions, the third connector member being coupled to the corner member.

8. The chassis platform module of claim 7, wherein the third connector member comprises:
- a third body including a fifth assembly surface brought into surface contact with an end of the corner body, facing the battery side member, and a sixth assembly surface brought into surface contact with an end of the battery side member, facing the corner body;
- a fifth coupling part protruding from the third body toward the corner body, and fitted to the pair of first corner guide protrusions and coupled to the first corner guide surface; and
- a sixth coupling part protruding from the third body toward the corner body, and fitted to the pair of second corner guide protrusions and coupled to the second corner guide surface.

* * * * *